(12) United States Patent
Kudo et al.

(10) Patent No.: US 10,129,442 B2
(45) Date of Patent: Nov. 13, 2018

(54) INFORMATION PROCESSING APPARATUS AND INFORMATION PROCESSING METHOD

(71) Applicant: SONY CORPORATION, Tokyo (JP)

(72) Inventors: Yusuke Kudo, Kanagawa (JP); Katsuya Hyodo, Kanagawa (JP); Daisuke Nakata, Kanagawa (JP); Ryo Fukazawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/559,862

(22) PCT Filed: Feb. 3, 2016

(86) PCT No.: PCT/JP2016/000560
§ 371 (c)(1),
(2) Date: Sep. 20, 2017

(87) PCT Pub. No.: WO2016/157678
PCT Pub. Date: Oct. 6, 2016

(65) Prior Publication Data
US 2018/0063384 A1    Mar. 1, 2018

(30) Foreign Application Priority Data

Mar. 31, 2015    (JP) .................. 2015-071091

(51) Int. Cl.
*H04N 5/04*    (2006.01)
*G06F 3/16*    (2006.01)
(Continued)

(52) U.S. Cl.
CPC .............. *H04N 5/04* (2013.01); *G02B 27/01* (2013.01); *G06F 3/16* (2013.01); *G10L 13/033* (2013.01);
(Continued)

(58) Field of Classification Search
CPC .......... H04N 5/04; G06F 3/16; G10L 13/0335
See application file for complete search history.

(56) References Cited

U.S. PATENT DOCUMENTS

2002/0019736 A1    2/2002 Kimura et al.
2004/0015450 A1*   1/2004 Zingher ............. G06K 9/00597
                                                              705/64
(Continued)

FOREIGN PATENT DOCUMENTS

CN      104246435 A      12/2014
DE    112012006804 T5     7/2015
(Continued)

OTHER PUBLICATIONS

International Search Report and Written Opinion of PCT Application No. PCT/JP2016/000560, dated Apr. 12, 2016, 10 pages of ISRWO.

*Primary Examiner* — Michael E Teitelbaum
(74) *Attorney, Agent, or Firm* — Chip Law Group

(57) ABSTRACT

An information processing apparatus includes a sound information obtaining unit, and a sound synthesizer unit. The sound information obtaining unit is configured to obtain a plurality of sound information items, the plurality of sound information items being on sounds indicating a plurality of user-selectable candidates, respectively. The sound synthesizer unit is configured to synthesize the plurality of sound information items such that output sounds indicating the plurality of candidates, respectively, at least partially overlap one another.

10 Claims, 11 Drawing Sheets

(51) Int. Cl.
  *G02B 27/01*  (2006.01)
  *H04N 5/60*  (2006.01)
  *G10L 13/033*  (2013.01)

(52) U.S. Cl.
  CPC ......... *H04N 5/602* (2013.01); *G10L 13/0335* (2013.01)

(56) References Cited

U.S. PATENT DOCUMENTS

| | | | |
|---|---|---|---|
| 2005/0038657 A1* | 2/2005 | Roth | G10L 15/19 704/260 |
| 2006/0143012 A1 | 6/2006 | Kimura et al. | |
| 2008/0045199 A1* | 2/2008 | Lee | G10L 13/00 455/414.4 |
| 2010/0145686 A1* | 6/2010 | Honda | G10L 13/08 704/205 |
| 2015/0032364 A1 | 1/2015 | Yamaguchi | |

FOREIGN PATENT DOCUMENTS

| | | | |
|---|---|---|---|
| JP | 2002-032098 A | 1/2002 |
| JP | 2005-274639 A | 10/2005 |
| JP | 2010-128099 A | 6/2010 |
| JP | 2010-134203 A | 6/2010 |
| JP | 2011-221237 A | 11/2011 |
| JP | 5774195 B2 | 9/2015 |
| WO | 2013/132712 A1 | 9/2013 |

\* cited by examiner

FIG. 5A

| Candidate No. | Text information | Importance |
|---|---|---|
| 1 | Setagaya | 3.54 |
| 2 | Nakamoto | 3.53 |
| 3 | Nantsu | 3.53 |
| 4 | Keisuke | 3.51 |

FIG. 5B

| Candidate No. | Text information | Importance | Overlap amount |
|---|---|---|---|
| 1 | Setagaya | 3.54 | 0 |
| 2 | Nakamoto | 3.53 | 1 |
| 3 | Nantsu | 3.53 | 1 |
| 4 | Keisuke | 3.51 | 1 |

FIG. 5C

| Candidate No. | Text information | Importance | Overlap amount | Number of times |
|---|---|---|---|---|
| 1 | Setagaya | 3.54 | 0 | 2 |
| 2 | Nakamoto | 3.53 | 1 | 1 |
| 3 | Nantsu | 3.53 | 1 | 1 |
| 4 | Keisuke | 3.51 | 1 | 1 |

FIG. 5D

| Candidate No. | Text information | Importance | Overlap amount | Number of times | Timing |
|---|---|---|---|---|---|
| 1 | Setagaya | 3.54 | 0 | 2 | 0:00 0:05 |
| 2 | Nakamoto | 3.53 | 1 | 1 | 0:02 |
| 3 | Nantsu | 3.53 | 1 | 1 | 0:03 |
| 4 | Keisuke | 3.51 | 1 | 1 | 0:04 |

FIG. 5E

| Candidate No. | Text information | Importance | Overlap amount | Number of times | Timing | Sound-quality | Sound-image |
|---|---|---|---|---|---|---|---|
| 1 | Setagaya | 3.54 | 0 | 2 | 0:00 0:05 | Female/high | Upper right |
| 2 | Nakamoto | 3.53 | 1 | 1 | 0:02 | Male/low | Lower right |
| 3 | Nantsu | 3.53 | 1 | 1 | 0:03 | Female/low | Upper left |
| 4 | Keisuke | 3.51 | 1 | 1 | 0:04 | Male/high | Lower left |

…

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/000560 filed on Feb. 3, 2016, which claims priority benefit of Japanese Patent Application No. JP 2015-071091 filed in the Japan Patent Office on Mar. 31, 2015. Each of the above-referenced applications is hereby incorporated herein by reference in its entirety.

TECHNICAL FIELD

The present technology relates to an information processing apparatus configured to control a sound output device to output sounds indicating a plurality of user-selectable candidates, respectively, an information processing method, and a program.

BACKGROUND ART

There is known a technology of transmitting a sound guidance, with which a user is capable of selecting one candidate phrase from a plurality of candidate phrases (for example, see claim 1 of Patent Literature 1).

CITATION LIST

Patent Literature

Patent Literature 1: Japanese Patent Application Laid-open No. 2005-274639

DISCLOSURE OF INVENTION

Technical Problem

It is desirable for such an apparatus to be further user-friendly since such an apparatus acts on the hearing sense of a user directly.

In view of the above-mentioned circumstances, it is an object of the present technology to provide a user-friendly information processing apparatus, an information processing method, and a program.

Solution to Problem

According to an embodiment of the present technology, an information processing apparatus includes a sound information obtaining unit, and a sound synthesizer unit. The sound information obtaining unit is configured to obtain a plurality of sound information items, the plurality of sound information items being on sounds indicating a plurality of user-selectable candidates, respectively. The sound synthesizer unit is configured to synthesize the plurality of sound information items such that output sounds indicating the plurality of candidates, respectively, at least partially overlap one another.

According to the present embodiment, the output sounds indicating the plurality of candidates, respectively, at least partially overlap one another. As a result, the total time period in which all the sounds are output is shortened.

The information processing apparatus further includes an overlap amount determining unit configured to determine overlap amounts of the sounds indicating the plurality of candidates, respectively.

According to the present embodiment, the overlap amounts may be dynamically changed on the basis of various conditions and set information.

The overlap amount determining unit is configured to determine the overlap amounts of the sounds indicating the plurality of candidates, respectively, on the basis of user information, the user information being detected information on a user.

The user information includes at least one of biological-body information on a user, behavior information on a user, and environment information on an environment around a user.

According to the present embodiment, the biological stress, the motional stress, or the environmental stress of the user may be predicted on the basis of the user information, and the overlap amounts may be dynamically changed depending on the predicted stress.

The overlap amount determining unit is configured to determine the overlap amounts of the sounds indicating the plurality of candidates, respectively, on the basis of importance of the plurality of candidates, respectively.

According to the present embodiment, the overlap amounts may be dynamically changed further depending on the importance. Since the overlap amounts are dynamically changed on the basis of not only user information but also importance, it is possible to select the overlap amounts more appropriately.

The information processing apparatus further includes an image information control unit configured to obtain image information items on images indicating the plurality of user-selectable candidates, respectively, and control the image information items such that a sound indicating a particular candidate and an image indicating the particular candidate are output in synchronization with each other.

According to the present embodiment, a user is capable of recognizing the selectable candidates not only auditorily but also visually, and thus recognizing all the candidates faster and more accurately. As a result, it may further be user-friendly.

The information processing apparatus further includes a sound-quality/sound-image assigning unit configured to change sound-qualities and/or sound-images of the sounds indicating the plurality of candidates, respectively, such that sound-qualities and/or sound-images of the sounds indicating the plurality of candidates, respectively, are at least partially different from each other.

According to the present embodiment, when output sounds indicating the plurality of candidates, respectively, at least partially overlap one another, a user may easily recognize the respective sounds, since the sound-qualities and/or the sound-images are different from each other.

The sound-quality/sound-image assigning unit is configured to determine the sound-qualities and/or the sound-images of the sounds indicating the plurality of candidates, respectively, on the basis of the user information.

According to the present embodiment, the biological stress, motional stress, or environmental stress of a user is predicted on the basis of the user information, and the number of sound-qualities/sound-images may be dynamically changed depending on the predicted stress.

The sound-quality/sound-image assigning unit is configured to determine the sound-qualities and/or the sound-images of the sounds indicating the plurality of candidates, respectively, on the basis of the importance of the plurality of candidates, respectively.

According to the present embodiment, the sound-qualities/sound-images may be dynamically changed further depending on the importance. Since the sound-qualities/sound-images are dynamically changed on the basis of not only the user information but also the importance, it is possible to select the sound-qualities/sound-images more appropriately.

According to an embodiment of the present technology, an information processing method includes: obtaining a plurality of sound information items, the plurality of sound information items being on sounds indicating a plurality of user-selectable candidates, respectively; and synthesizing the plurality of sound information items such that output sounds indicating the plurality of candidates, respectively, at least partially overlap one another.

According to an embodiment of the present technology, a program causes a computer to operate as a sound information obtaining unit, and a sound synthesizer unit. The sound information obtaining unit is configured to obtain a plurality of sound information items, the plurality of sound information items being on sounds indicating a plurality of user-selectable candidates, respectively. The sound synthesizer unit is configured to synthesize the plurality of sound information items such that output sounds indicating the plurality of candidates, respectively, at least partially overlap one another.

Advantageous Effects of Invention

As described above, according to the present technology, a user-friendly information processing apparatus, an information processing method, and a program will be provided.

Note that the effects described here are not the limitation, and any of the effects described in the present disclosure may be obtained.

BRIEF DESCRIPTION OF DRAWINGS

FIGS. 5A, 5B, 5C, 5D and 5E Diagrams showing an example of the candidate list.

MODE(S) FOR CARRYING OUT THE INVENTION

Figure 1:
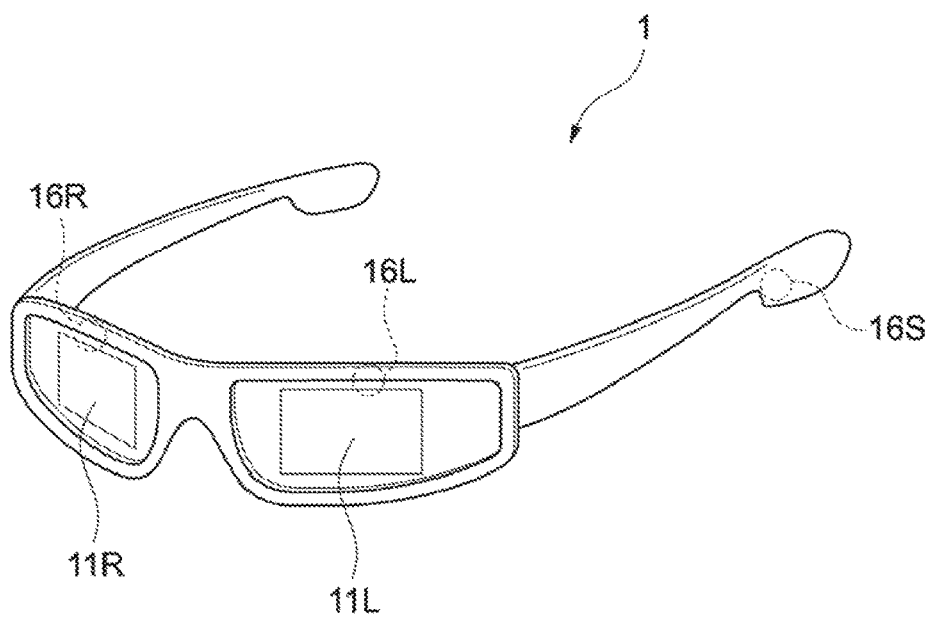
FIG. 1 A perspective view showing at least part of an information processing apparatus of a first embodiment.

Hereinafter, embodiments of the present technology will be described with reference to the drawings.

1. First Embodiment 1-1. Outline of First Embodiment

There is known a technology of transmitting sounds indicating a plurality of user-selectable candidates, respectively, to a user. According to this technology, typically, a plurality of candidates are pronounced in order one by one. As a result, it may take time for the user to recognize all the selectable candidates, and it may thus be user-unfriendly.

In view of the above-mentioned circumstances, according to the present embodiment, an information processing apparatus 1 includes: a sound information obtaining unit (text/sound converter unit 107) configured to obtain a plurality of sound information items, the plurality of sound information items being on sounds indicating a plurality of user-selectable candidates, respectively; and a sound synthesizer unit 108 configured to synthesize the plurality of sound information items such that output sounds indicating the plurality of candidates, respectively, at least partially overlap one another.

The information processing apparatus 1 further includes an overlap amount determining unit 104 configured to determine overlap amounts of the sounds indicating the plurality of candidates, respectively.

The overlap amount determining unit 104 is configured to determine the overlap amounts of the sounds indicating the plurality of candidates, respectively, on the basis of user information, the user information being detected information on a user.

The user information includes at least one of biological-body information on a user, behavior information on a user, and environment information on an environment around a user.

The overlap amount determining unit 104 is configured to determine the overlap amounts of the sounds indicating the plurality of candidates, respectively, on the basis of importance of the plurality of candidates, respectively.

The information processing apparatus 1 further includes a sound-quality/sound-image assigning unit 106 configured to change sound-qualities and/or sound-images of the sounds indicating the plurality of candidates, respectively, such that sound-qualities and/or sound-images of the sounds indicating the plurality of candidates, respectively, are at least partially different from each other.

The sound-quality/sound-image assigning unit 106 is configured to determine the sound-qualities and/or the sound-images of the sounds indicating the plurality of candidates, respectively, on the basis of the user information.

The information processing apparatus 1 further includes a sound output unit 17 configured to output the sounds such that the sounds indicating the plurality of candidates, respectively, at least partially overlap one another.

1-2. Hardware Configuration of Information Processing Apparatus

Figure 2:
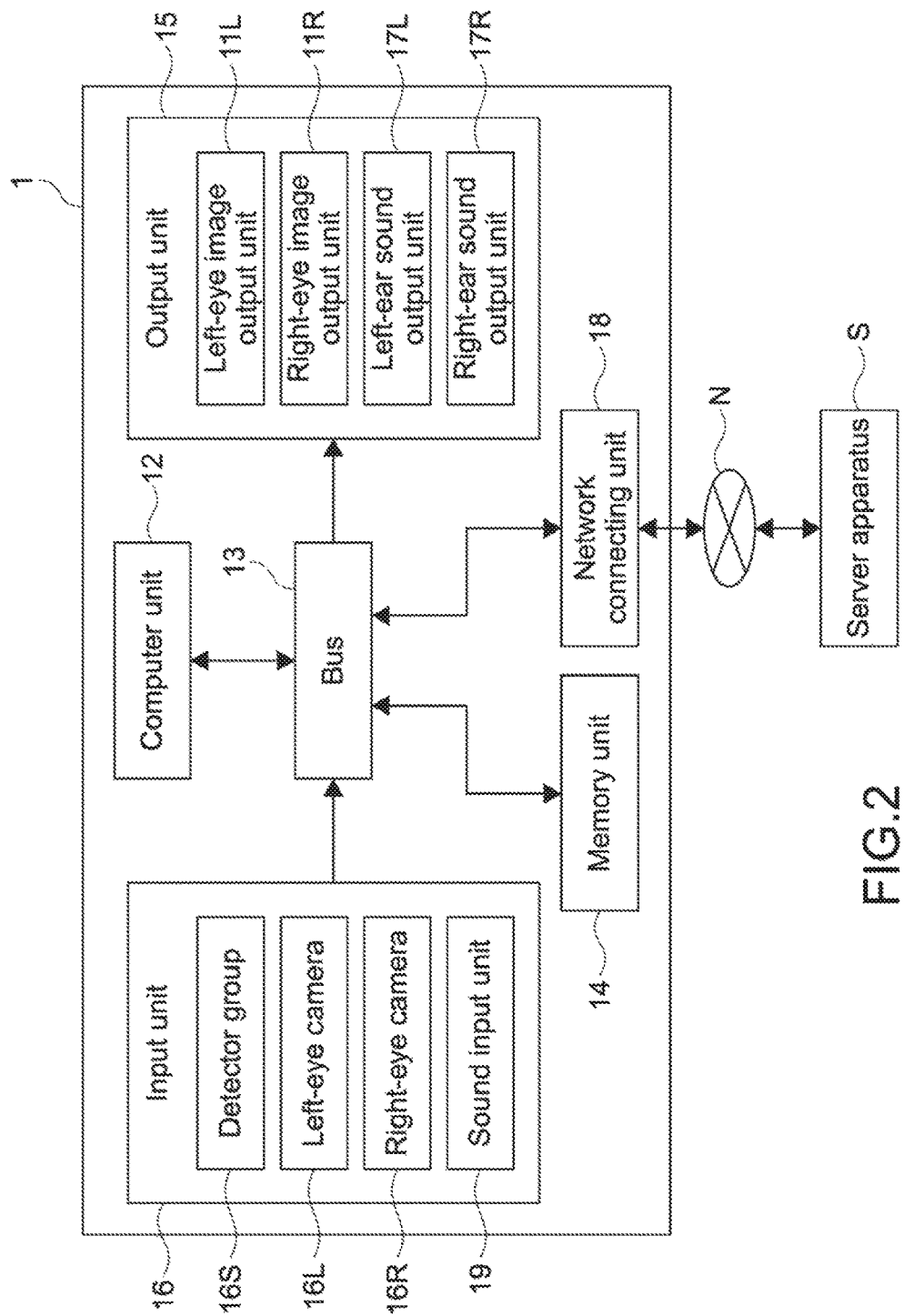
FIG. 2 A block diagram showing a hardware configuration of the information processing apparatus.

FIG. 1 is a perspective view showing at least part of an information processing apparatus of a first embodiment. FIG. 2 is a block diagram showing a hardware configuration of the information processing apparatus.

In the information processing apparatus 1, the memory unit 14, the output unit 15, the input unit 16, and the network connecting unit 18 are connected to the computer unit 12 via the bus 13.

The memory unit 14 includes a ROM (Read Only Memory), a RAM (Random Access Memory), and another semiconductor memory. The ROM fixedly stores programs that the computer unit 12 executes, data, and the like. The programs stored in the ROM are loaded in the RAM.

The computer unit 12 includes a CPU (Central Processing Unit), a GPU (Graphics Processing Unit), and the like. The computer unit 12 executes the programs loaded in the RAM.

The output unit 15 includes the left-eye image output unit 11L and the right-eye image output unit 11R for the right-and-left eyes of a person, the left-ear sound output unit 17L, and the right-ear sound output unit 17R. Note that, hereinafter, the image output units 11L, 11R will sometimes be collectively referred to as the image output unit(s) 11, and the sound output units 17L, 17R will sometimes be collectively referred to as the sound output unit(s) 17. The image output unit 11 executes computer processing on the basis of information received from the computer unit 12, and displays generated image signals on the displays. The sound output unit 17 executes computer processing on the basis of information received from the computer unit 12, and outputs generated sounds from speakers.

The input unit 16 includes the sound input unit 19, the left-eye camera 16L and the right-eye camera 16R that take pictures of right-and-left eyeballs of the user, and the detector group 16S. The input unit 16 converts analog sound signals input from the sound input unit 19 (microphone) to digital signals that can be processed by the computer unit 12, and supplies the digital signals to the computer unit 12. The input unit 16 writes gaze information obtained by the cameras 16L, 16R (gaze information obtaining unit) and information detected by the detector group 16S in the memory unit 14 as logs. Typically, the input unit 16 further includes an information input unit (not shown) such as buttons in which a user may input information as necessary.

The detector group 16S includes a plurality of detectors that detect biological-body information on a user, information that is used to determine behavior information on a user, and information that is used to determine environment information on an environment around a user.

Specific examples of the detectors that detect biological-body information on a user include a heartbeat sensor, a sweating sensor, a temperature (body temperature) sensor, a brain-wave sensor, and the like.

Specific examples of the detectors that detect information that is used to obtain behavior information on a user include an acceleration sensor, a gyro sensor, a geomagnetic sensor (9-axis sensor), and the like that detect motion and posture (walk, run, stop, etc.) of a user.

Specific examples of the detectors that detect information that is used to obtain environment information on an environment around a user include receiver devices that employ technologies such as GPS (Global Positioning System), Wi-Fi (registered trademark), and SLAM (Simultaneous Localization and Mapping), an environment camera that takes a picture of a field of vision of a user, a microphone that detects sounds (noise) around a user, a luminance sensor that detects brightness-and-darkness of environment light, and the like.

The network connecting unit 18 accesses the server apparatus S via the network N such as the Internet, and sends/receives information to/from the server apparatus S.

Typically, for example, the information processing apparatus 1, which integrally has the above-mentioned hardware configuration, is a see-through or covered head mount display (hereinafter simply referred to as HMD). Note that an electronic device/electronic devices (not shown) wiredly or wirelessly connected to the HMD may include at least part of the hardware configuration of the information processing apparatus 1.

1-3. Functional Configuration of Information Processing Apparatus

Figure 3:
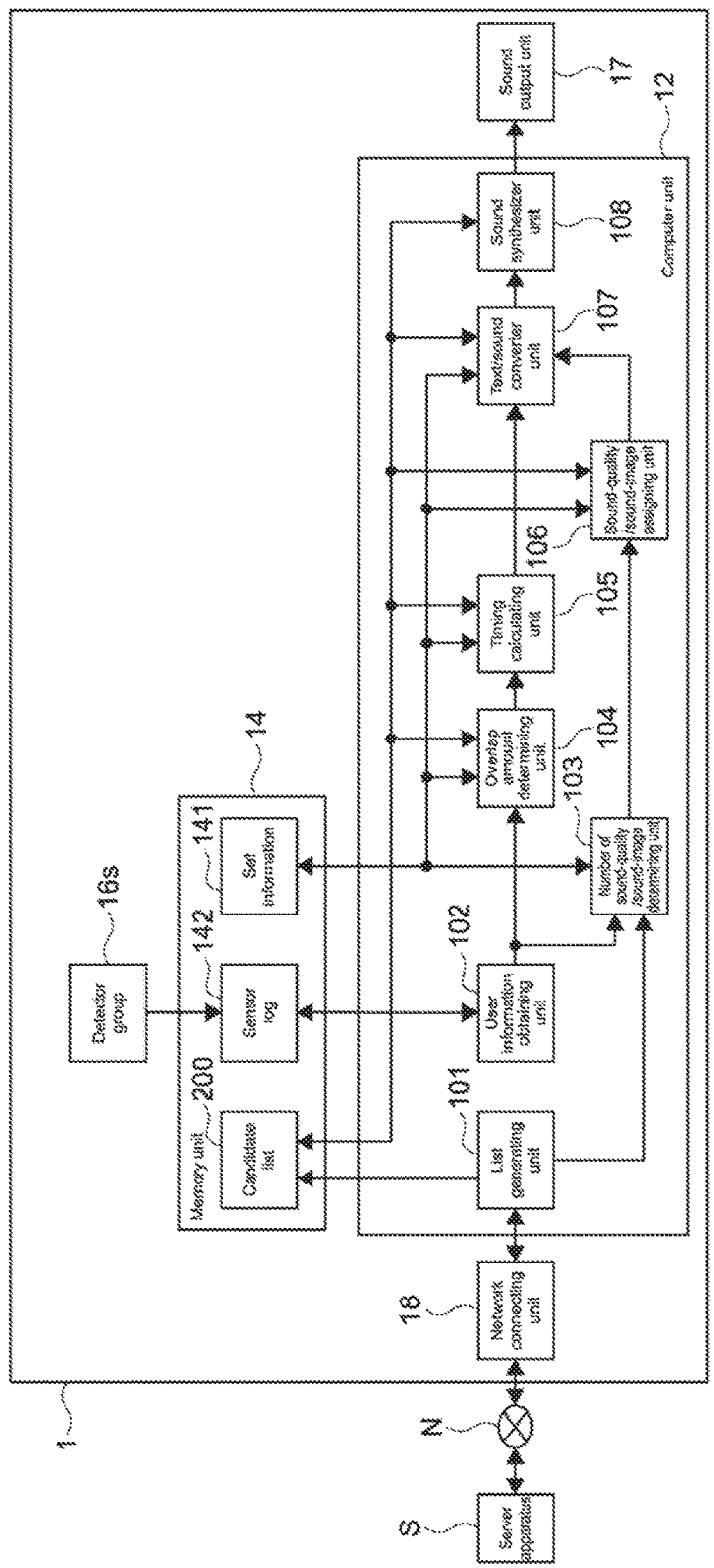
FIG. 3 A diagram showing a functional configuration of the information processing apparatus.

FIG. 3 is a diagram showing a functional configuration of the information processing apparatus.

The information processing apparatus 1 includes the list generating unit 101, the number of sound-quality/sound-image determining unit 103, the user information obtaining unit 102, the overlap amount determining unit 104, the timing calculating unit 105, the sound-quality/sound-image assigning unit 106, the text/sound converter unit 107 (sound information obtaining unit), and the sound synthesizer unit 108.

The list generating unit 101 accesses the server apparatus S, i.e., a data source, via the network N by using the network connecting unit 18, and searches the server apparatus S for information items on a plurality of user-selectable candidates.

The user information obtaining unit 102 reads the information written in the sensor log 142 by the detector group 16S. The user information obtaining unit 102 uses the read information as it is as user information, and generates user information on the basis of the read information.

The number of sound-quality/sound-image determining unit 103 determines the number of sound-qualities/sound-images of sounds indicating a predetermined number of candidates, respectively.

The overlap amount determining unit 104 determines overlap amounts of the sounds indicating the predetermined number of user-selectable candidates, respectively.

The timing calculating unit 105 calculates the number of times of outputting the sounds indicating the candidates, respectively, by the sound output unit 17, and calculates timing at which the sounds are output.

The sound-quality/sound-image assigning unit 106 assigns sound-qualities and sound-images to the plurality of candidates.

The text/sound converter unit 107 converts text information items indicating the candidates, respectively, to sound information items on sounds indicating the candidates, respectively.

The sound synthesizer unit 108 reproduces the sound information items of the candidates, respectively. The sound output unit 17 outputs the sound information items reproduced by the sound synthesizer unit 108, as sounds, from a pair of right-and-left speakers.

1-4. Operations of Information Processing Apparatus

Next, with reference to a plurality of flowcharts, operations of the information processing apparatus 1 having the above-mentioned functional configuration will be described more specifically.

Figure 4:
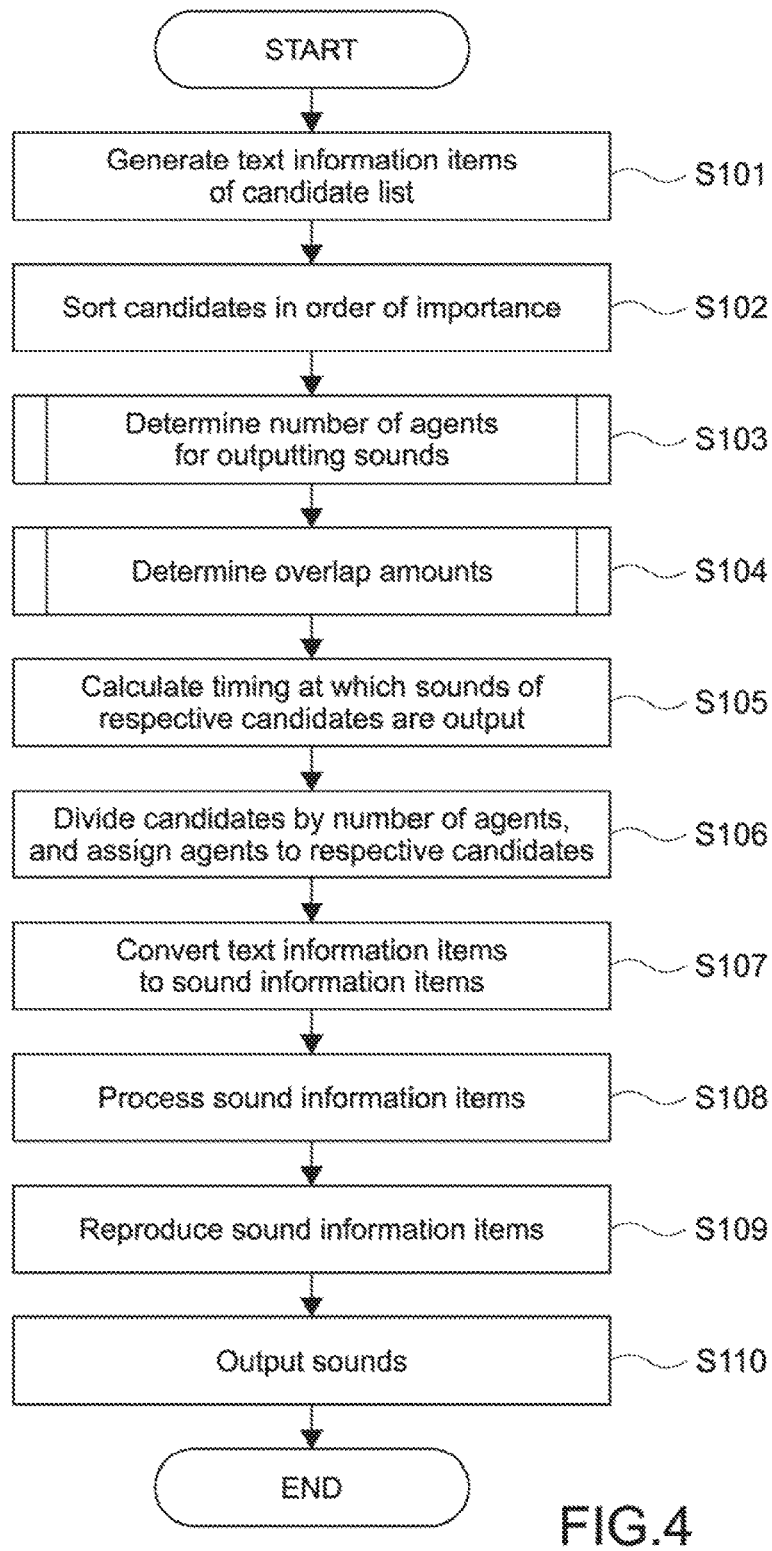
FIG. 4 A flowchart showing operations of the information processing apparatus.

FIG. 4 is a flowchart showing operations of the information processing apparatus.

When a predetermined application is started, the list generating unit 101 accesses the server apparatus S, i.e., a data source, via the network N by using the network connecting unit 18. Note that, in the present embodiment described below, for example, a "predetermined application" is a restaurant finder application. The list generating unit 101 searches the server apparatus S for information items on a predetermined number of user-selectable candidates. In the present embodiment, specifically, the "information items on a predetermined number of user-selectable candidates" are information items on a predetermined number of restaurants located in a predetermined distance range from the present location of a user of the information processing apparatus 1. The "information items on restaurants" include various information items such as names of restaurants and importance (in this example, social evaluation scores), for example. The list generating unit 101 generates text information items indicating the predetermined number of user-selectable candidates, respectively, on the basis of the obtained information items, and generates the candidate list 200, i.e., a list including the text information items. The list generating unit 101 stores the generated candidate list 200 in the memory unit 14 (Step S101). In this example, the "text information items" are names of restaurants, respectively.

FIGS. 5A, 5B, 5C, 5D and 5E are diagrams showing an example of the candidate list.

For example, the list generating unit 101 sorts, in the descending order of the importance 203, the text information items 202 (names of restaurants) indicating the predetermined number of (in this example, four) user-selectable candidates 201, respectively, and rewrites the candidate list 200 stored in the memory unit 14 (Step S102, FIG. 5A). The list generating unit 101 notifies the number of sound-quality/sound-image determining unit 103 that the candidate list 200 is generated and sorted. Note that the various kinds of values in the candidate list 200 of FIGS. 5A, 5B 5C, 5D and 5E are merely examples, and other values may be employed, as a matter of course.

Upon receiving the notification, the number of sound-quality/sound-image determining unit 103 determines the number of sound-qualities/sound-images of sounds indicating the predetermined number of candidates, respectively (Step S103). Here, the "sound-quality" means the sound-quality (voice-quality) of sound output by the sound output unit 17, and is, specifically, one of high pitch/low pitch, male voice/female voice, adult voice/child voice, and the like, or a combination of at least part of them. The "sound-image" means a combination of the direction and the distance of a sound source that a user feels. The "number of sound-qualities/sound-images" means the number of combinations of a sound-quality and a sound-image (this combination will sometimes be referred to as "agent"). Hereinafter, the method of determining the number of sound-qualities/sound-images in Step S103 will be described specifically.

Figure 6:
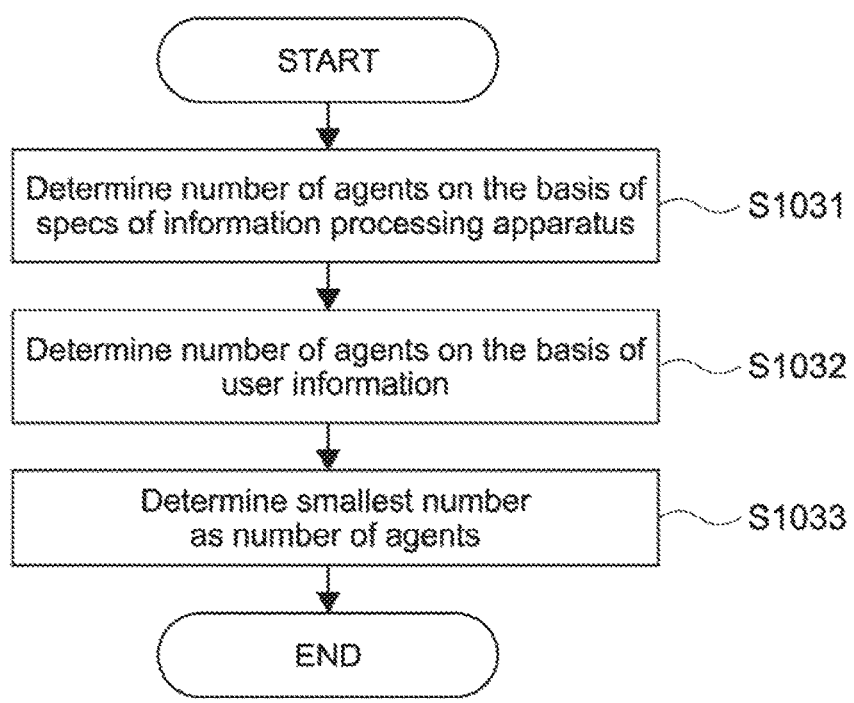
FIG. 6 A flowchart showing a method of determining the number of sound-qualities/sound-images.

FIG. 6 is a flowchart showing a method of determining the number of sound-qualities/sound-images.

With reference to the set information 141 stored in the memory unit 14, the number of sound-quality/sound-image determining unit 103 determines the number of agents on the basis of the specs of the information processing apparatus 1 (Step S1031). The "specs of the information processing apparatus 1" include, for example, the number of channels with which the sound output unit 17 is capable of outputting sounds, and the like. The "set information 141" includes various information preset in the information processing apparatus 1, and various information not preset but set by a user.

Meanwhile, the detector group 16S writes detected information in the sensor log 142 of the memory unit 14. Specific examples of the detected information include biological-body information on a user (heartbeat, sweating, body temperature, brain-wave, etc.), data of an acceleration sensor, a gyro sensor, a geomagnetic sensor (9-axis sensor), and the like, GPS information, Wi-Fi information, SLAM information, information on a picture taken by an environment camera, and microphone sound (noise) information.

The user information obtaining unit 102 reads the information written in the sensor log 142 by the detector group 16S. The user information obtaining unit 102 uses the read information as it is as user information, and generates user information on the basis of the read information. For example, the user information obtaining unit 102 uses the read biological-body information on a user (heartbeat, sweating, body temperature, brain-wave, etc.) as it is. Alternatively, for example, the user information obtaining unit 102 determines the behavior (motion, posture (run, walk, stop, etc.)) of a user on the basis of the read data of an acceleration sensor, a gyro sensor, a geomagnetic sensor (9-axis sensor), and the like to thereby obtain behavior information on a user. Alternatively, for example, the user information obtaining unit 102 determines environment information on an environment around a user on the basis of the read GPS information, Wi-Fi information, SLAM information, information on a picture taken by an environment camera, and microphone sound (noise) information, and luminance information on environment light to thereby obtain environment information on an environment around a use. The user information obtaining unit 102 supplies the obtained user information (biological-body information on a user, behavior information on a user, environment information on an environment around a user) to the number of sound-quality/sound-image determining unit 103 and the overlap amount determining unit 104.

In the present embodiment, it is assumed that, specifically, the user information obtaining unit 102 determines the behavior (activity is larger than predetermined value (in motion), activity is predetermined value or less (at rest)) of a user on the basis of information on at least an acceleration sensor to thereby obtain behavior information on a user.

Upon obtaining the user information from the user information obtaining unit 102, the number of sound-quality/sound-image determining unit 103 determines the number of agents on the basis of the user information (Step S1032). For example, where the user's activity is larger than the predetermined value, the number of sound-quality/sound-image determining unit 103 sets the number of agents=1. Where the user's activity is the predetermined value or less, the number of sound-quality/sound-image determining unit 103 obtains the number of agents set by a user (or default number) with reference to the set information 141.

The number of sound-quality/sound-image determining unit 103 determines, as the definitive number of agents, the smallest one of the number of agents based on the specs of the information processing apparatus 1 (determined in Step S1031) and the number of agents based on the user information (determined in Step S1032) (Step S1033). The number of sound-quality/sound-image determining unit 103 notifies the sound-quality/sound-image assigning unit 106 of the determined number of agents.

With reference to FIG. 4 again, meanwhile, upon obtaining the user information from the user information obtaining unit 102, the overlap amount determining unit 104 determines overlap amounts of the sounds indicating the predetermined number of user-selectable candidates, respectively (Step S104). Here, the "overlap amount" means a time period (for example, several seconds or less) in which the end of a sound indicating one particular candidate output by the sound output unit 17 laps over (overlaps) the beginning of the next sound indicating another candidate. Hereinafter, a method of determining an overlap amount in Step S104 will be described specifically.

Figure 7:
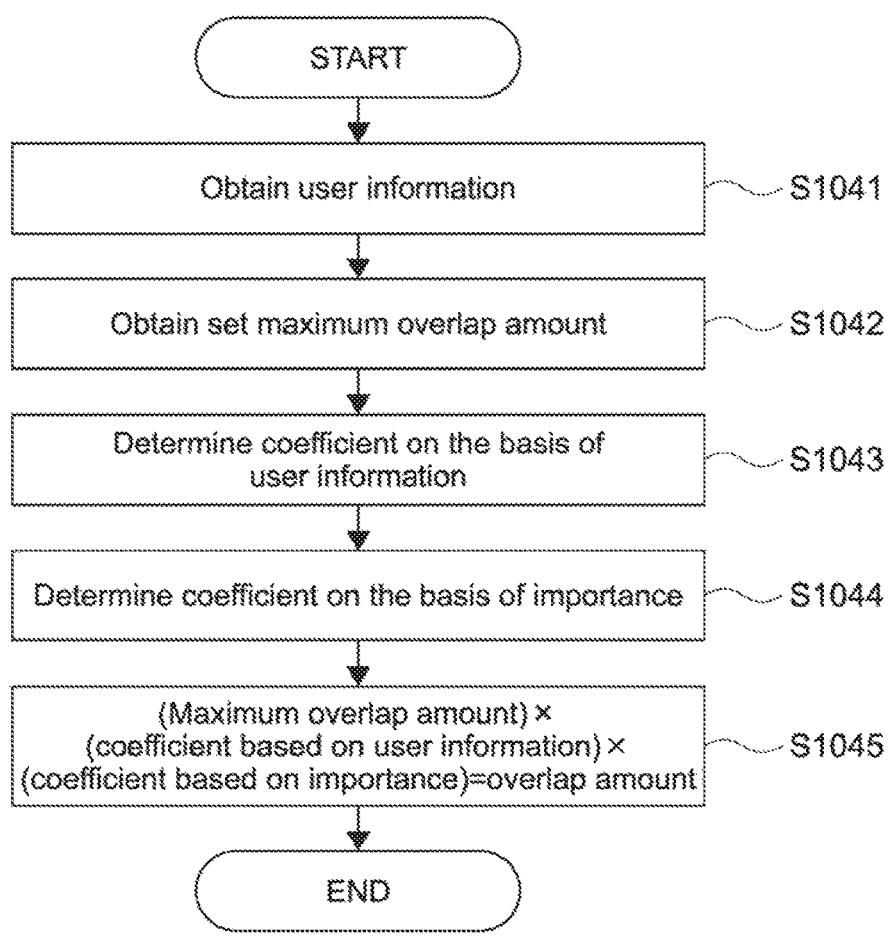
FIG. 7 A flowchart showing a method of determining an overlap amount.

FIG. 7 is a flowchart showing a method of determining an overlap amount.

The overlap amount determining unit 104 obtains the user information from the user information obtaining unit 102 (Step S1041). Subsequently, with reference to the set information 141 stored in the memory unit 14, the overlap amount determining unit 104 obtains the maximum overlap amount set by a user (or default overlap amount) (Step S1042).

Subsequently, the overlap amount determining unit 104 determines a coefficient on the basis of the user information (obtained in Step S1041) (Step S1043). For example, where the user's activity is larger than the predetermined value (in motion), the overlap amount determining unit 104 sets the coefficient=0.0. Where the user's activity is the predetermined value or less (at rest), the overlap amount determining unit 104 sets the coefficient=1.0.

Subsequently, with reference to the candidate list 200 stored in the memory unit 14, the overlap amount determining unit 104 determines a coefficient on the basis of the importance 203 for each candidate 201 (Step S1044). For example, the overlap amount determining unit 104 sets the coefficient=0.0 for a candidate having importance larger than a predetermined value. The overlap amount determining unit 104 sets the coefficient=1.0 for a candidate having importance equal to or less than the predetermined value.

With reference to the set information 141 stored in the memory unit 14, the overlap amount determining unit 104 obtains the preset maximum overlap amount. The overlap amount determining unit 104 calculates (obtained maximum overlap amount)*(coefficient determined on the basis of user information in Step S1043)*(coefficient for each candidate determined on the basis of importance 203 in Step S1044). The overlap amount determining unit 104 determines, as the definitive overlap amount, the value obtained by multiplication for each candidate (Step S1045). The overlap amount determining unit 104 writes the overlap amount 204 determined for each candidate 201 in the candidate list 200 (FIG. 5B), and notifies the timing calculating unit 105 of that.

With reference to FIG. 4 again, upon receiving the notification from the overlap amount determining unit 104, the timing calculating unit 105 calculates the number of times of outputting the sounds indicating the candidates, respectively, by the sound output unit 17, and calculates timing at which the sounds are output (Step S105). Firstly, with reference to the candidate list 200 stored in the memory unit 14, the timing calculating unit 105 determines the number of times of outputting the sound for each candidate 201 on the basis of the importance 203. For example, the timing calculating unit 105 sets a larger number of times of outputting the sound for a candidate having higher importance, and sets a smaller number of times of outputting the sound for a candidate having lower importance. The timing calculating unit 105 writes the number of times 205 determined for each candidate 201 in the candidate list 200 (FIG. 5C). Subsequently, the timing calculating unit 105 calculates, on the basis of the overlap amounts 204 and the numbers of times 205, timing at which the sounds indicating the candidates, respectively, are output by the sound output unit 17. The timing calculating unit 105 writes the timing 206 calculated for each candidate 201 in the candidate list 200 (FIG. 5D), and notifies the text/sound converter unit 107 of that.

Meanwhile, upon receiving the notification of the number of agents (Step S1033) from the number of sound-quality/sound-image determining unit 103, with reference to the candidate list 200, the sound-quality/sound-image assigning unit 106 divides the predetermined number of candidates 201 recorded in the candidate list 200 by the number of agents. The sound-quality/sound-image assigning unit 106 writes the sound-qualities 207 and the sound-images 208 being agents in the candidate list 200 such that different agents are respectively assigned to a plurality of candidate groups (one candidate group, where number of agent=1), which are obtained by dividing the predetermined number of candidates 201 (FIG. 5E). As a result, the sound-qualities 207 and the sound-images 208 are assigned to all the predetermined number of candidates 201 (Step S106). For example, with reference to the set information 141, the sound-quality/sound-image assigning unit 106 obtains arbitrary preset combinations of a sound-quality and a sound-image (agents), the number of the patterns being the same as the number of agents. The sound-quality/sound-image assigning unit 106 assigns the obtained combinations of a sound-quality and a sound-image (agents) to the plurality of candidate groups at random, respectively. Note that, where there are the plurality of agents, the sound-quality/sound-image assigning unit 106 assigns the agents such that the agent of the sound indicating one particular candidate is different from the agent of the sound indicating another candidate output next. The sound-quality/sound-image assigning unit 106 notifies the text/sound converter unit 107 that the sound-qualities 207 and the sound-images 208 are written in the candidate list 200.

Upon receiving the notifications from the timing calculating unit 105 and the sound-quality/sound-image assigning unit 106, with reference to the candidate list 200, the text/sound converter unit 107 converts the text information items 202 indicating the candidates 201, respectively, to sound information items on sounds indicating the candidates 201, respectively (Step S107). Specifically, the text/sound converter unit 107 converts the text information item 202 indicating one particular candidate 201 to a sound information item on a sound, in which the sound-quality 207 assigned to the candidate 201 is reflected. Subsequently, the text/sound converter unit 107 processes the generated sound information item (Step S108). Specific examples of to "process a sound information item" include to change the speed and to change the volume. For example, on the basis of the importance 203 written in the candidate list 200, the text/sound converter unit 107 sets a low speed for outputting a sound of a candidate having high importance, and sets a high speed for outputting a sound of a candidate having low importance. Alternatively, on the basis of the importance 203, the text/sound converter unit 107 sets a high volume for a candidate having high importance, and sets a low volume for a candidate having low importance. The text/sound converter unit 107 supplies the sound information items generated for the candidates, respectively, to the sound synthesizer unit 108. Note that the text/sound converter unit 107 may generate and process the sound information items on the basis of the set information 141 stored in the memory unit 14.

Upon obtaining the sound information items from the text/sound converter unit 107, with reference to the candidate list 200, the sound synthesizer unit 108 reproduces the sound information items generated for the candidates 201, respectively, at the numbers of times 205, the timing 206, and the sound-images 208 written in the candidate list 200 (Step S109). The sound output unit 17 outputs the sound information items reproduced by the sound synthesizer unit 108, as sounds, from the pair of right-and-left speakers (Step S110).

Note that, in this example, a social evaluation score is used as the "importance". Alternatively, for example, the distance from the present location of a user to a restaurant may be used. The importance may be higher where a restaurant is closer, and the importance may be lower where a restaurant is farther.

1-5. Conclusion

There is known a technology of transmitting sounds indicating a plurality of user-selectable candidates, respectively, to a user. According to this technology, typically, a plurality of candidates are pronounced in order one by one. As a result, it may take time for the user to recognize all the selectable candidates, and it may thus be user-unfriendly.

To the contrary, according to the present embodiment, output sounds indicating the plurality of candidates, respectively, at least partially overlap one another. As a result, the total time period in which all the sounds are output is shortened, and it may thus be less user-unfriendly. Note that to "at least partially overlap" also means all the sounds indicating the plurality of candidates, respectively, overlap one another.

Typically, when people speak on different topics, a person is capable of selectively listening to information that he is interested in, even if he does not concentrate on listening to conversations (cocktail-party effect). One reason of effectively attaining this hearing function is that the fundamental frequencies (sound-qualities) of voices of people are different one by one, or that the directions and distances (sound-images) of the sound sources (people speaking) are different one by one.

In view of the above-mentioned circumstances, according to the present embodiment, the sound-quality/sound-image (agent) of the sound of one particular candidate is at least made different from the sound-quality/sound-image (agent) of the sound of another candidate output next. As a result, when output sounds indicating the plurality of candidates, respectively, at least partially overlap one another, a user may easily recognize the respective sounds.

Further, according to the present embodiment, the overlap amounts and the number of sound-qualities/sound-images (agents) are determined on the basis of the user information (biological-body information, behavior information, environment information). In other words, the biological stress, motional stress, or environmental stress of a user is predicted on the basis of the user information, and the overlap amount and the number of sound-qualities/sound-images (agents) are dynamically changed depending on the predicted stress.

For example, where it is predicted that the biological stress, motional stress, or environmental stress of a user is low, the overlap amount is increased. As a result, the number of sounds output simultaneously may be increased. Accordingly, where the stress of a user is low, the total time period in which all the sounds are output is further shortened.

To the contrary, for example, where it is predicted that the biological stress, motional stress, or environmental stress of a user is high, the overlap amount is reduced. As a result, the number of sounds output simultaneously may be reduced. In this case, where the stress of a user is higher than a predetermined threshold, the overlap amount may be zero. Further, where the stress of a user is high, the number of sound-qualities/sound-images (agents) is increased. Accordingly, where it is predicted that the stress of a user is high, the user may more easily recognize the respective sounds.

Further, according to the present embodiment, the overlap amounts are dynamically changed on the basis of not only user information but also importance. As a result, it is possible to select the overlap amounts more appropriately.

2. Second Embodiment

In the following, description on the configuration, operation, behavior, and the like similar to those of the aforementioned embodiments will be omitted, and different points will mainly be described. Further, reference signs and step numbers, which are similar to the reference signs and step numbers of the configuration and operations of the aforementioned embodiments, will be used to denote the similar configuration and operations.

2-1. Configuration of Second Embodiment

In the first embodiment, the list generating unit 101 searches the server apparatus S for information items on a plurality of user-selectable candidates (restaurants) via the network N. To the contrary, according to a second embodiment, the list generating unit 101 searches the memory unit 14 for a plurality of installed applications as a plurality of user-selectable candidates.

Figure 8:
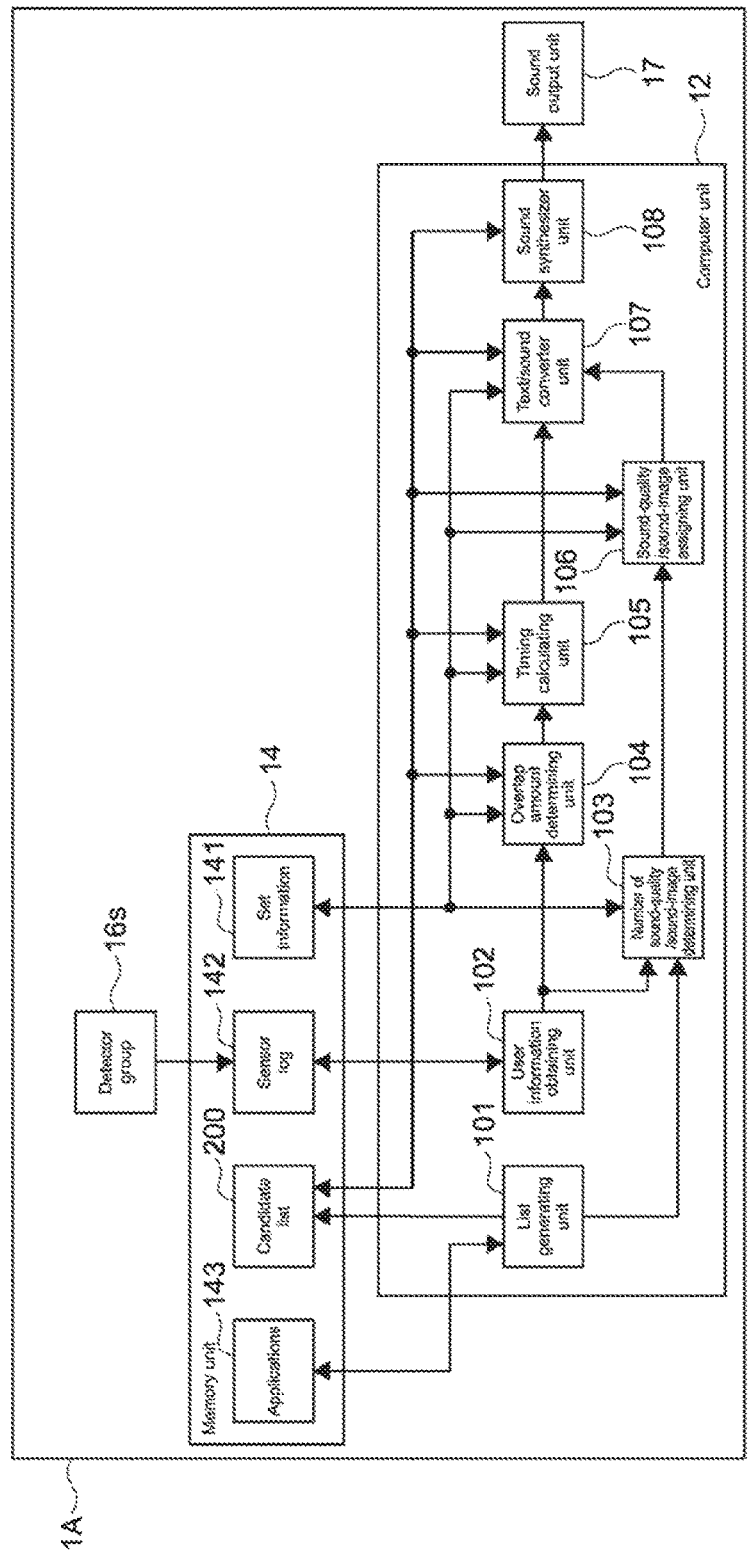
FIG. 8 A block diagram showing a functional configuration of an information processing apparatus of a second embodiment.

FIG. 8 is a block diagram showing a functional configuration of an information processing apparatus of a second embodiment.

When a predetermined application (in this example, application launcher) is started, the list generating unit 101 of the information processing apparatus 1A searches the memory unit 14 for information items on the plurality of installed applications 143 being information items on a predetermined number of user-selectable candidates. The "information items on the applications 143" include various information items such as names of applications and importance, for example. The list generating unit 101 generates text information items (names of applications) indicating the predetermined number of user-selectable candidates, respectively, on the basis of the obtained information items, and generates the candidate list 200, i.e., a list including the text information items.

The "importance" of an application is based on, for example, the use frequency of the application, the recent activity of the application, and the start-up priority. Where the "importance" is based on the start-up priority, for example, when there is unread e-mail, the start-up priority of an e-mail browser is high and high importance is thus set for the e-mail browser.

The other functions of the information processing apparatus 1A of the second embodiment are similar to the functions of the information processing apparatus 1 of the first embodiment.

2-2. Modification Example of Second Embodiment

According to a modification example of the second embodiment, when a predetermined application (in the modification example, messaging application, e-mail browser) is started, the list generating unit 101 of the information processing apparatus 1A searches the memory unit 14 for information items on message destinations being information items on a predetermined number of user-selectable candidates. The "information items on message destinations" include, for example, various information items such as names of friends as message destinations and importance. The list generating unit 101 generates text information items (names of friends) indicating the predetermined number of user-selectable candidates, respectively, on the basis of the obtained information items, and generates the candidate list 200, i.e., a list including the text information items. The "importance" of a message destination is based on, for example, the message exchange frequency, the recent message exchange activity, and the descending order of the new (latest) login time.

3. Third Embodiment

3-1. Configuration of Third Embodiment

In the first embodiment, the information processing apparatus 1 provides a plurality of candidates to a user one-way. To the contrary, according to a third embodiment, the information processing apparatus provides a plurality of selectable candidates being hints to a user interactively (two-way, dialogically).

Figure 9:
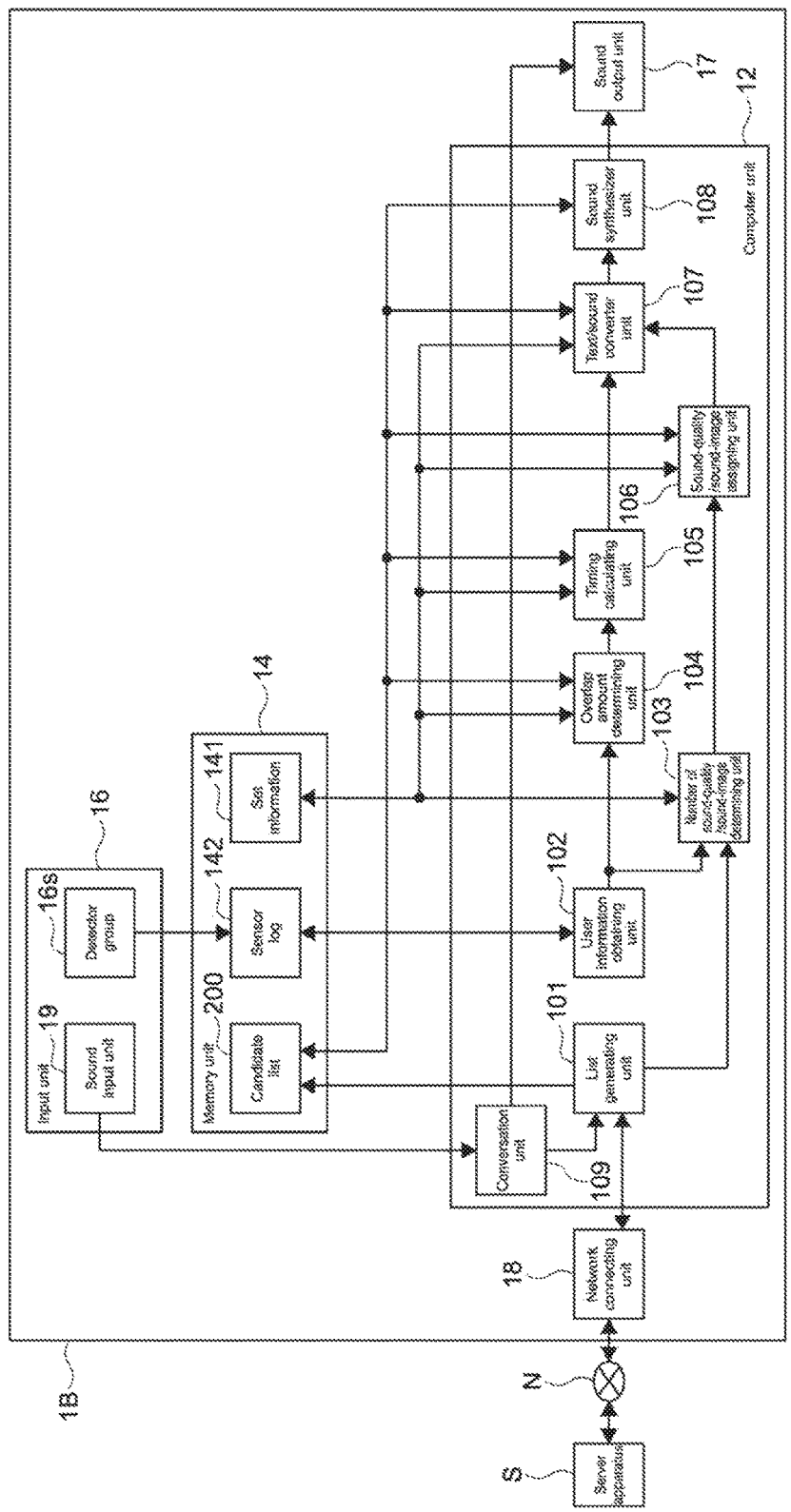
FIG. 9 A block diagram showing a functional configuration of an information processing apparatus of a third embodiment.
Figure 10:
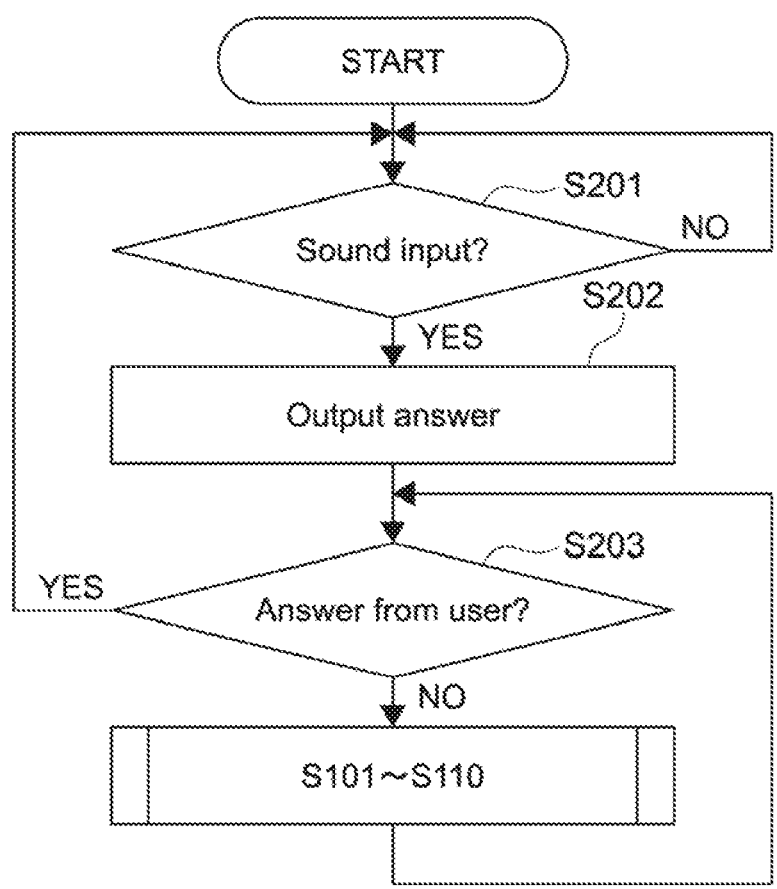
FIG. 10 A flowchart showing operations of the information processing apparatus.

FIG. 9 is a block diagram showing a functional configuration of an information processing apparatus of a third embodiment. FIG. 10 is a flowchart showing operations of the information processing apparatus.

The input unit 16 of the information processing apparatus 1B converts an analog sound signal input from the sound input unit 19 (microphone) to a digital signal processable by the computer unit 12, and supplies the digital signal to the conversation unit 109. In this example, it is assumed that a speech of a user "find a restaurant" is input as an "analog sound signal". Upon obtaining a digital signal from the sound input unit 19 (Step S201, Yes), the conversation unit 109 outputs an answer "what do you want to eat?" from the sound output unit 17 in response to the speech of the user (Step S202). Where the conversation unit 109 obtains an answer from the user in a predetermined time period via the sound input unit 19 (Step S203, YES), the conversation unit 109 stands by until a speech of the user is input again. Meanwhile, where the conversation unit 109 does not obtain an answer from the user in a predetermined time period via the sound input unit 19 (user keeps silent in a predetermined time period) (Step S203, NO), the conversation unit 109 notifies the list generating unit 101 of that. Upon receiving the notification, the list generating unit 101 searches the server apparatus S for information items on a plurality of user-selectable candidates (restaurants, menus, categories) via the network N (Step S101). Then, the operations on and after Step S101 are executed. Note that, an example of "menu" is "noodle soup", and an example of "category" is "French".

3-2. Modification Example of Third Embodiment

According to a modification example of the third embodiment, the list generating unit 101 may search not the server apparatus S but the memory unit 17 for broad information items (menus, categories), which do not relate to the present location of a user, as a plurality of user-selectable candidates.

In the present embodiment, where the conversation unit 109 does not obtain an answer from the user in a predetermined time period via the sound input unit 19 (user keeps silent in a predetermined time period), the list generating unit 101 starts the operation to provide a plurality of user-selectable candidates (Step S203, NO). Meanwhile, where the conversation unit 109 obtains an answer from the user in a predetermined time period via the sound input unit 19 (Step S203, YES), the conversation unit 109 stands by until a speech of the user is input again. Alternatively, the following modification examples may be employed.

According to a modification example, the operation to provide a plurality of user-selectable candidates may be started where the user information obtaining unit 102 detects a predetermined motion (gesture) of a user. Examples of gestures include to look up, to look down, to incline the head, to touch the chin, mouth, or head, to close the eyes, and the like. Then, the conversation unit 109 may stand by until a speech of the user is input again where the user information obtaining unit 102 detects that the user returns to the starting position.

According to another modification example, the operation to provide a plurality of user-selectable candidates may be started where the input unit 16 detects a predetermined operation input in a button. Then, the conversation unit 109 may stand by until a speech of the user is input again where the input unit 16 detects a predetermined operation input in a button.

According to another modification example, the operation to provide a plurality of user-selectable candidates may be started where a predetermined speech ("for example?" or the like) of the user is input in the sound input unit 19.

4. Fourth Embodiment

4-1. Configuration of Fourth Embodiment

According to the first embodiment, the information processing apparatus outputs sounds indicating a plurality of selectable candidates, respectively, for a user. According to a fourth embodiment, the information processing apparatus outputs sounds indicating a plurality of selectable candidates, respectively, and, in addition, outputs images indicating the plurality of selectable candidates, respectively, at the same time for a user.

In short, the information processing apparatus further includes an image information control unit 111 configured to obtain image information items on images indicating the plurality of user-selectable candidates, respectively, and control the image information items such that a sound indicating a particular candidate and an image indicating the particular candidate are output in synchronization with each other.

Figure 11:
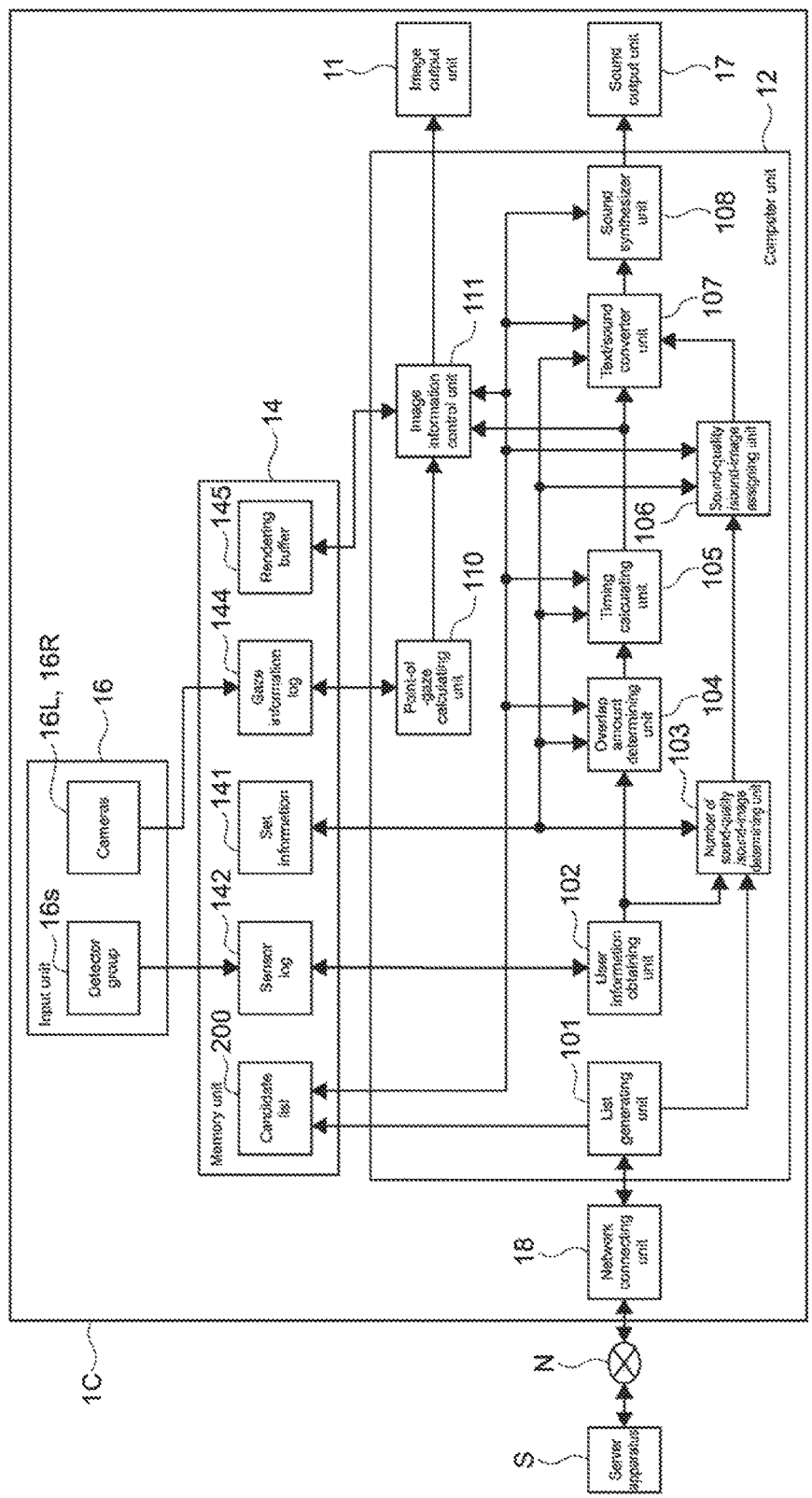
FIG. 11 A block diagram showing a functional configuration of an information processing apparatus of a fourth embodiment.

FIG. 11 is a block diagram showing a hardware configuration of an information processing apparatus of a fourth embodiment.

The information processing apparatus 1C further includes the point-of-gaze calculating unit 110, and the image information control unit 111.

Each of the cameras 16L, 16R obtains gaze information on a user. Specifically, the cameras 16L, 16R take pictures of the right-and-left eyeballs of a user, and writes gaze information in the gaze information log 144 of the memory unit 14. The gaze information is information on gaze directions (x, y, z) of a user).

With reference to the gaze information log 144, the point-of-gaze calculating unit 110 calculates the point-of-gaze (x, y) on the display 111 of the image output unit 11 on the basis of the gaze information (gaze directions (x, y, z) of user). The point-of-gaze calculating unit 110 supplies position information on the calculated point-of-gaze, i.e., point-of-gaze information, to the image information control unit 111.

The list generating unit 101 searches the server apparatus S for information items on a predetermined number of user-selectable candidates. The "information items on a predetermined number of user-selectable candidates" (in this example, information items on restaurants) include, for example, names and importance of restaurants and, in addition, image information items. The candidate list 200 generated by the list generating unit 101 includes the image information items.

The timing calculating unit 105 writes the timing 206 calculated for each candidate 201 in the candidate list 200, and notifies the text/sound converter unit 107 and, in addition, the image information control unit 111 of that.

With reference to the candidate list 200 stored in the memory unit 14, the image information control unit 111 obtains image information items for the candidates 201, respectively. The image information control unit 111 writes animation information items on the images of the candidates 201, respectively, in the rendering buffer 145 of the memory unit 14 on the basis of the image information items indicating the candidates 201, respectively. Here, the image information control unit 111 generates animation information items such that displaying the images indicating the candidates 201, respectively, is started at the timing notified of by the timing calculating unit 105 and such that the images move from the surrounding area to the center area of a display. The image information control unit 111 controls the display start positions, moving directions, and moving speeds of the plurality of images such that a space is provided between each images in the center area. Note that the "center area" corresponds to the central field of view (field of view of high-precision visual performance) of a user, the point-of-gaze obtained from the point-of-gaze calculating unit 110 being the center. The "surrounding area" corresponds to the peripheral field of view (field of view of low-precision visual performance) of a user, which surrounds the center area. The image information control unit 111 supplies the animation information items on the images indicating the candidates 201, respectively, to the image output unit 11 at the timing notified of by the timing calculating unit 105. As a result, the sound indicating a particular candidate and the image indicating the candidate are output in synchronization with each other.

Note that where the list generating unit 101 fails to obtain an image of a predetermined candidate from the server apparatus S, then the image information control unit 111 may output a text information item indicating the candidate, as an image.

According to the present embodiment, the sound indicating a particular candidate and the image indicating the candidate are output in synchronization with each other. As a result, a user is capable of recognizing the selectable candidates not only auditorily but also visually, and thus recognizing all the candidates faster and more accurately. As a result, it may further be user-friendly.

4-2. Modification Examples of Fourth Embodiment

As a modification example of the fourth embodiment, a displayed image may not be an animation but a still image. Alternatively, the image output function of the fourth embodiment may be in combination with the second or third embodiment.

Alternatively, the size, position, speed, or the like of an image may be changed depending on user information and importance. For example, where it is predicted that the stress of a user is high on the basis of the user information, the size of the image may be increased, the image may be displayed at a position close to the point-of-gaze, or the speed of the animation may be lowered. Where it is predicted that the stress of a user is low, the size of the image may be decreased, the image may be displayed at a position far from the point-of-gaze, or the speed of the animation may be increased. Where the importance is high, the size of the image may be increased, or the image may be displayed at a position close to the point-of-gaze. Where the importance is low, the size of the image may be decreased, or the image may be displayed at a position far from the point-of-gaze.

5. Specific Examples of Parameters for Dynamically Changing Overlap Amounts and Number of Agents According to the first embodiment, the information processing apparatus dynamically changes the overlap amounts and the number of sound-qualities/sound-images (agents) on the basis of behavior information (in motion, at rest) on a user. Other specific examples of parameters for dynamically changing the overlap amounts and the number of sound-qualities/sound-images (agents) are as follows.

For example, the user information obtaining unit 102 obtains motion information on the user's head on the basis of data of a gyro sensor and an acceleration sensor (head tracking). The overlap amount determining unit 104 reduces the overlap amounts, and the number of sound-quality/sound-image determining unit 103 increases the number of sound-qualities/sound-images, for example, when the user's head is moving actively (when user is running, etc.) since it is predicted that it is difficult for the user to accurately recognize the sounds indicating the plurality of candidates.

For another example, the user information obtaining unit 102 detects the motion speed (run, walk, stop) of a user on the basis of a GPS movement distance, a relative position of SLAM localization, a position estimated on the basis of Wi-Fi, or the like. Similar to the first embodiment, the overlap amount determining unit 104 reduces the overlap amounts, and the number of sound-quality/sound-image determining unit 103 increases the number of sound-qualities/sound-images, when the user is moving rapidly (when user is running, etc.) since it is predicted that it is difficult for the user to accurately recognize the sounds indicating the plurality of candidates.

For another example, the user information obtaining unit 102 may have a learning function, store information detected by the detector group 16S, and predict the behavior (sit, use stairs, drive, speak, etc.) of a user. For example, where it is predicted that the behavior of a user is driving or speaking, the overlap amount determining unit 104 reduces the overlap amounts, and the number of sound-quality/sound-image determining unit 103 increases the number of sound-qualities/sound-images. For another example of the learning function, the user information obtaining unit 102 records a noise, a heartbeat value, or the like when a user tries to replay sounds. Since it is predicted that it is difficult for the user to listen to sounds when that noise or that heartbeat value is detected, the overlap amount determining unit 104 reduces the overlap amounts, and the number of sound-quality/sound-image determining unit 103 increases the number of sound-qualities/sound-images.

For another example, where the heartbeat value detected by a heartbeat sensor is equal to or larger than a threshold, or where the sweating value detected by a sweating sensor is equal to or larger than a threshold, the user information obtaining unit 102 determines that the user feels nervous.

The overlap amount determining unit 104 reduces the overlap amounts, and the number of sound-quality/sound-image determining unit 103 increases the number of sound-qualities/sound-images, where the user feels nervous since it is predicted that it is difficult for the user to accurately recognize the sounds indicating the plurality of candidates.

For another example, the user information obtaining unit 102 determines that a user is in a noisy environment, where a noise detected by a microphone for detecting sounds (noise) around a user is equal to or larger than a threshold. Where a user is in the noisy environment, the overlap amount determining unit 104 reduces the overlap amounts, and the number of sound-quality/sound-image determining unit 103 increases the number of sound-qualities/sound-images, since it is predicted that it is difficult for the user to accurately recognize the sounds indicating the plurality of candidates.

6. Other Embodiments

According to the first embodiment, the overlap amount determining unit 104 determines overlap amounts on the basis of user information and importance. The overlap amount determining unit 104 may determine overlap amounts further on the basis of the number of agents. For example, the overlap amount determining unit 104 may set larger overlap amounts when the number of agents is larger. Where a plurality of different kinds of agents (combinations of sound-quality and sound-image) are used, a user may easily recognize the respective sounds even if the overlap amounts are larger. Further, the total time period in which all the sounds are output is further shortened.

According to the first embodiment, the sound-quality/sound-image assigning unit 106 assigns sound-qualities and sound-images to the plurality of candidates at random, respectively. Alternatively, the sound-quality/sound-image assigning unit 106 may select sound-qualities and sound-images on the basis of importance and user information. In short, the sound-quality/sound-image assigning unit 106 may be configured to determine the sound-qualities and/or the sound-images of the sounds indicating the plurality of candidates, respectively, on the basis of the importance of the plurality of candidates, respectively.

Typically, it is understood that people may listen to female voices easier than male voices from the viewpoint of frequency band. For example, the sound-quality/sound-image assigning unit 106 may assign female voices to candidates having higher importance, and assign male voices to candidates having lower importance. Alternatively, the sound-quality/sound-image assigning unit 106 may increase the number of candidates to which female voices are assigned where it is predicted that the stress of a user is high on the basis of user information, and decrease the number of candidates to which female voices are assigned where it is predicted that the stress is low.

Typically, for example, the information processing apparatus is a see-through or covered HMD, which integrally has the output unit 15, the input unit 16, the network connecting unit 18, and the like. Alternatively, the information processing apparatus may be a combination of a mobile device (smartphone, etc.) or a wearable device (wrist band type, pendant type, etc.) including the input unit 16, a headphone (including open type, pendant type) including the sound output unit 17, and a wearable device (HMD, etc.) including the image output unit 11. Alternatively, the information processing apparatus may be a combination of a desktop device (personal computer, set-top box, etc.) including the input unit 16, a speaker system of the sound output unit 17, and a desktop device (television receiver, projector, etc.) including the image output unit 11.

Alternatively, the information processing apparatus may include, in combination, an electronic device configured to obtain user information, and a server apparatus capable of connecting with it via a network. In this case, the server apparatus receives at least part of information stored in a memory unit from the electronic device, stores the received information, executes at least part of processing executed by the information processing apparatus in each of the above-mentioned embodiments, and sends processed data to the electronic device. For example, the server apparatus may execute the processing executed by the information processing apparatus in the above-mentioned embodiments, except for outputting sounds.

A program, that causes an information processing apparatus to operate as the functional units of each of the embodiments and the modification examples, may be recorded in a non-transitory computer readable recording medium.

Note that the present technology may employ the following configurations.

(1) An information processing apparatus, including:
 a sound information obtaining unit configured to obtain a plurality of sound information items, the plurality of sound information items being on sounds indicating a plurality of user-selectable candidates, respectively; and
 a sound synthesizer unit configured to synthesize the plurality of sound information items such that output sounds indicating the plurality of candidates, respectively, at least partially overlap one another.

(2) The information processing apparatus according to the above-mentioned item (1), further including:
 an overlap amount determining unit configured to determine overlap amounts of the sounds indicating the plurality of candidates, respectively.

(3) The information processing apparatus according to the above-mentioned item (2), in which
 the overlap amount determining unit is configured to determine the overlap amounts of the sounds indicating the plurality of candidates, respectively, on the basis of user information, the user information being detected information on a user.

(4) The information processing apparatus according to the above-mentioned item (3), in which
 the user information includes at least one of biological-body information on a user, behavior information on a user, and environment information on an environment around a user.

(5) The information processing apparatus according to any one of the above-mentioned items (2) to (4), in which
 the overlap amount determining unit is configured to determine the overlap amounts of the sounds indicating the plurality of candidates, respectively, on the basis of importance of the plurality of candidates, respectively.

(6) The information processing apparatus according to any one of the above-mentioned items (1) to (5), further including:
 an image information control unit configured to
  obtain image information items on images indicating the plurality of user-selectable candidates, respectively, and
  control the image information items such that a sound indicating a particular candidate and an image indicating the particular candidate are output in synchronization with each other.

(7) The information processing apparatus according to any one of the above-mentioned items (1) to (6), further including:
a sound-quality/sound-image assigning unit configured to change sound-qualities and/or sound-images of the sounds indicating the plurality of candidates, respectively, such that sound-qualities and/or sound-images of the sounds indicating the plurality of candidates, respectively, are at least partially different from each other.
(8) The information processing apparatus according to the above-mentioned item (7), in which
the sound-quality/sound-image assigning unit is configured to determine the sound-qualities and/or the sound-images of the sounds indicating the plurality of candidates, respectively, on the basis of the user information.
(9) The information processing apparatus according to the above-mentioned item (7) or (8), in which
the sound-quality/sound-image assigning unit is configured to determine the sound-qualities and/or the sound-images of the sounds indicating the plurality of candidates, respectively, on the basis of the importance of the plurality of candidates, respectively.
(10) An information processing method, including:
obtaining a plurality of sound information items, the plurality of sound information items being on sounds indicating a plurality of user-selectable candidates, respectively; and
synthesizing the plurality of sound information items such that output sounds indicating the plurality of candidates, respectively, at least partially overlap one another.
(11) A program, that causes a computer to operate as:
a sound information obtaining unit configured to obtain a plurality of sound information items, the plurality of sound information items being on sounds indicating a plurality of user-selectable candidates, respectively; and
a sound synthesizer unit configured to synthesize the plurality of sound information items such that output sounds indicating the plurality of candidates, respectively, at least partially overlap one another.
(12) A non-transitory computer readable recording medium, that records a program, that causes a computer to operate as:
a sound information obtaining unit configured to obtain a plurality of sound information items, the plurality of sound information items being on sounds indicating a plurality of user-selectable candidates, respectively; and
a sound synthesizer unit configured to synthesize the plurality of sound information items such that output sounds indicating the plurality of candidates, respectively, at least partially overlap one another.

REFERENCE SIGNS LIST 1, 1A, 1B, 1C information processing apparatus
101 list generating unit
102 user information obtaining unit
103 number of sound-quality/sound-image determining unit
104 overlap amount determining unit
105 timing calculating unit
106 sound-quality/sound-image assigning unit
107 text/sound converter unit
108 sound synthesizer unit
200 candidate list

The invention claimed is:
1. An information processing apparatus, comprising:
circuitry configured to:
obtain a plurality of sound information items, wherein each of the plurality of sound information items corresponds to a respective sound of a plurality of sounds indicating a plurality of user-selectable candidates;
determine an amount of overlap between a first sound of the plurality of sounds and a second sound of the plurality of sounds, wherein the first sound indicates a first candidate of the plurality of user-selectable candidates and the second sound indicates a second candidate of the plurality of user-selectable candidates; and
synthesize, based on the amount of overlap, the plurality of sound information items such that the first sound at least partially overlaps the second sound.
2. The information processing apparatus according to claim 1, wherein the circuitry is further configured to:
acquire read information from a plurality of sensors, wherein the plurality of sensors detect user's activity;
determine user information based on the read information; and
determine the amount of overlap based on the user information.
3. The information processing apparatus according to claim 2, wherein the user information includes at least one of user's biological-body information, user's behavior information, and environment information of an user's environment.
4. The information processing apparatus according to claim 1, wherein the circuitry is further configured to determine the amount of overlap based on importance of the plurality of user-selectable candidates.
5. The information processing apparatus according to claim 2,
wherein the circuitry is further configured to:
obtain image information items of a plurality of images indicating the plurality of user-selectable candidates; and
control the image information items such that the first sound indicating the first candidate is in synchronization with a first image of the plurality of images, wherein the first image indicates the first candidate.
6. The information processing apparatus according to claim 5, wherein the circuitry is further:
configured to control at least one of sound-qualities or sound-images of the plurality of sounds, such that the at least one of sound-qualities or sound-images of each of the plurality of sounds are at least partially different from one another.
7. The information processing apparatus according to claim 5, wherein the circuitry is further configured to determine, based on the user information, at least one of sound-qualities or sound-images of the plurality of sounds.
8. The information processing apparatus according to claim 7, wherein the circuitry is further configured to determine the at least one of the sound-qualities or the sound-images of the plurality of sounds, based on importance of each of the plurality of user-selectable candidates.
9. An information processing method, comprising:
obtaining a plurality of sound information items, wherein each of the plurality of sound information items corresponds to a respective sound of a plurality of sounds indicating a plurality of user-selectable candidates;
determining an amount of overlap between a first sound of the plurality of sounds and a second sound of the plurality of sounds, wherein the first sound indicates a first candidate of the plurality of user-selectable can- didates and the second sound indicates a second candidate of the plurality of user-selectable candidates; and synthesizing, based on the amount of overlap, the plurality of sound information items such that the first sound overlaps the second sound.

10. A non-transitory computer-readable medium having stored thereon, computer-readable instructions, which when executed by a computer, cause the computer to execute operations, the operations comprising:

obtaining a plurality of sound information items, wherein each of the plurality of sound information items corresponds to a respective sound of a plurality of sounds indicating a plurality of user-selectable candidates;

determining an amount of overlap between a first sound of the plurality of sounds and a second sound of the plurality of sounds, wherein the first sound indicates a first candidate of the plurality of user-selectable candidates and the second sound indicates a second candidate of the plurality of user-selectable candidates; and synthesizing, based on the amount of overlap, the plurality of sound information items such that the first sound, at least partially overlaps the second sound.

\* \* \* \* \*